Feb. 25, 1964 P. A. FRANKEN 3,122,702
METHOD AND APPARATUS FOR PRODUCING AND MEASURING
THE ALIGNMENT OF METASTABLE HELIUM ATOMS
Filed Oct. 7, 1958 2 Sheets-Sheet 2
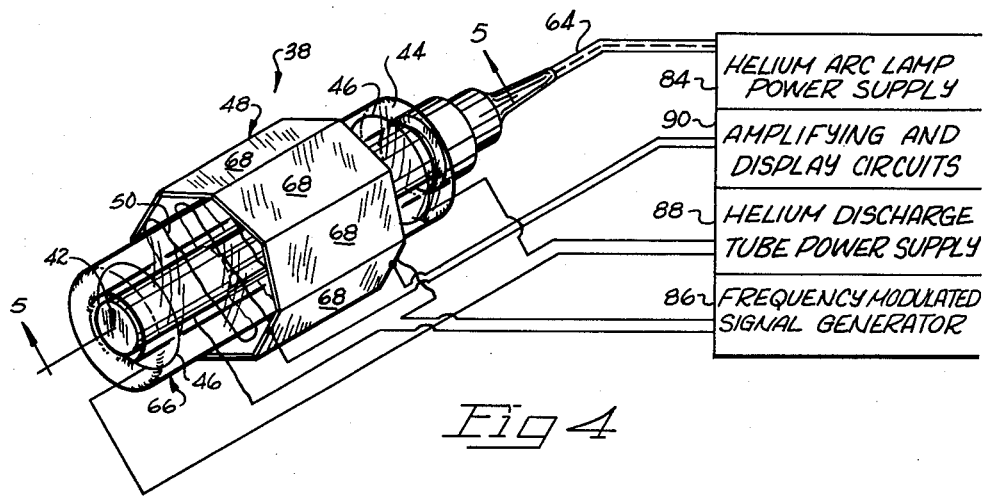
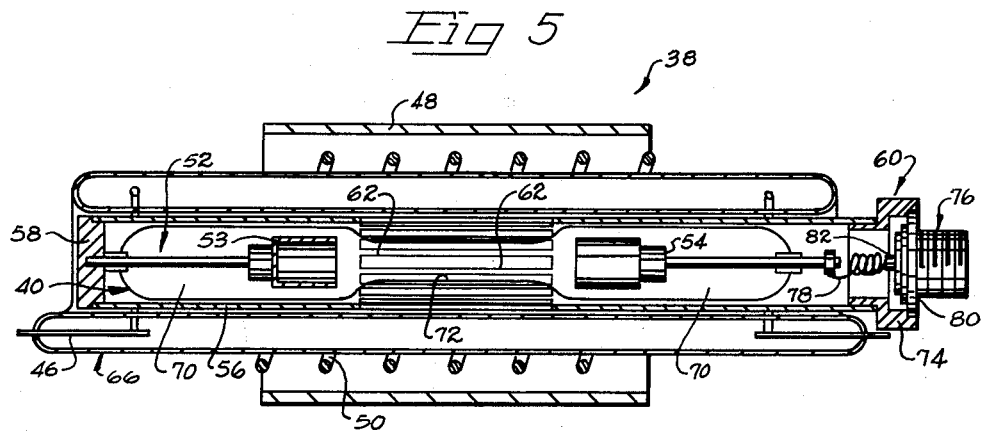
INVENTOR.
PETER A. FRANKEN
BY
SMITH, WILSON, LEWIS & M<sup>c</sup>RAE

United States Patent Office 3,122,702
Patented Feb. 25, 1964

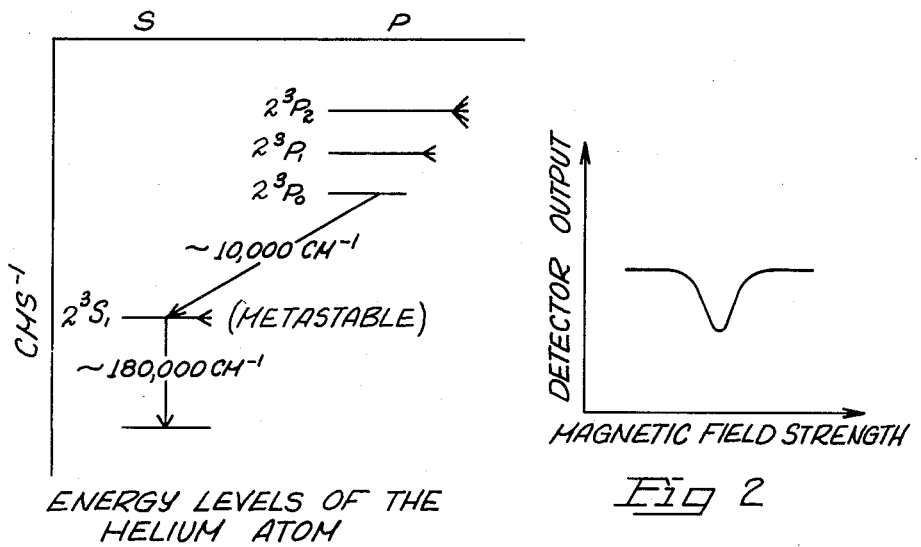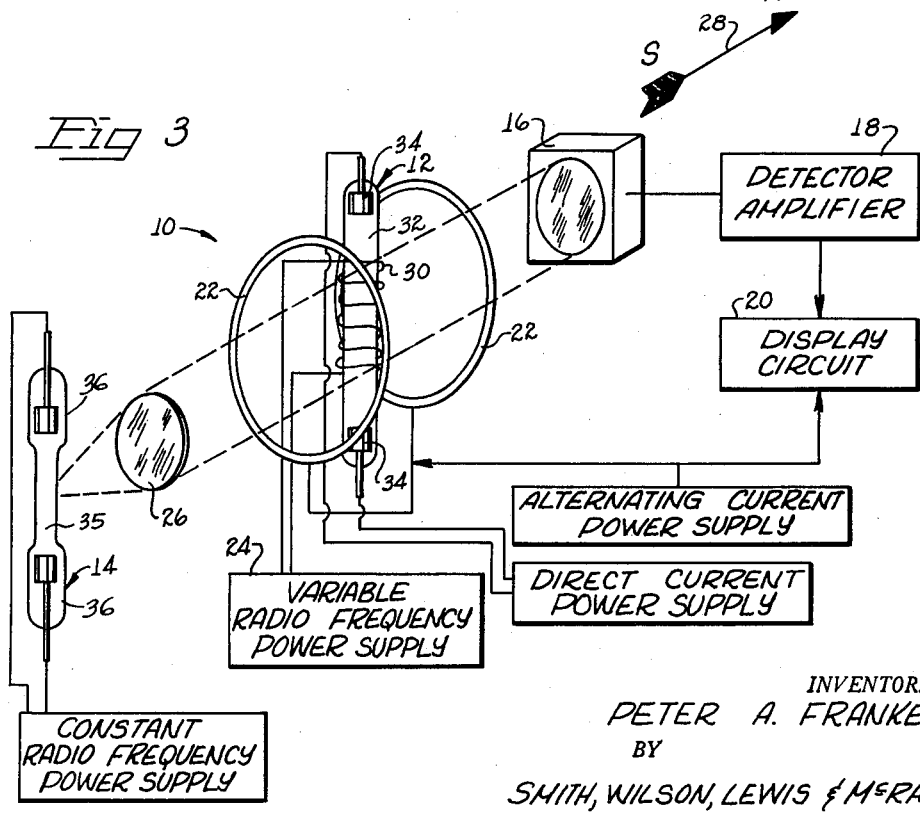

3,122,702
METHOD AND APPARATUS FOR PRODUCING AND MEASURING THE ALIGNMENT OF META-STABLE HELIUM ATOMS
Peter A. Franken, 1421 S. University, Ann Arbor, Mich.
Filed Oct. 7, 1958, Ser. No. 765,909
13 Claims. (Cl. 324—.5)

The present invention relates to a method and apparatus for aligning helium atoms. More particularly, this invention relates to a method of aligning helium atoms in the metastable $^3S_1$ state by subjecting the metastable atoms to unpolarized resonance radiation from a helium arc.

The present invention derives fundamentally from investigations of the line spectra of atoms. The study of atomic spectra, which has led to remarkable advances in the field of physics, has resulted in a body of well accepted theory of atomic spectra. The theories of operation of the present invention as discussed hereafter are founded upon this theoretical base, which is well known and understood by those skilled in the art.

Atomic spectra are created as a result of atomic excitation. An atom may be excited in a variety of ways and when excited will radiate energy as monochromatic light. Excitation may be accomplished, for example, by heating an element to cause violent atomic collisions, by placing an atom in a strong electric field, or by causing an atom to be hit by a speeding electron such as is done in a discharge tube. There is one type of excitation, resonance excitation, with which the present invention is particularly concerned. Resonance excitation is produced by resonance radiation, which may be defined as the energy of radiation necessary to excite a particular atom from one state to another. Resonance excitation takes place only when the energy of the incident quantum is exactly equal to that required to produce the particular change of state under consideration.

Excitation consists of displacing an electron in an atom from its normal orbit to an outer one. Such displacement of an electron involves the acquisition of energy. Generally, a displaced electron will tend to give up this acquired energy and return to its normal orbit. As it falls back to an interior orbit, it will lose the acquired energy by radiation.

Each of the various energy levels to which an electron may be displaced is identifiable by the characteristic spectrum line associated with the radiation of energy during the transition of the electron from an outer to an inner orbit.

Spectra are generally grouped into two classes. One class is termed emission spectra and the other is termed absorption spectra. Emission spectra are obtained by the radiation of energy as previously discussed. Absorption spectra result from the absorption of light energy by a substance and, in essence, are the obverse of emission spectra.

In view of the foregoing brief discussion of atomic spectra, the objects of the present invention may be stated as follows: to provide a method and apparatus utilizing the emission and absorptive spectra of the element helium by means of which:

(1) To measure the strength of a magnetic field or the variations in strength of several magnetic fields as may be desired for various purposes, e.g., locating magnetic materials of either natural or manufactured origin which may be in or around the earth or some other celestial body or in free space; determination of the strength of natural or artificial magnetic fields used in industrial and scientific applications; and determination of the composition of strata to aid in geological surveys directed, for example, at locating natural resources such as petroleum or minerals;

(2) To provide an instrument for use as a primary frequency standard for the accurate measurement of physical quantities; and (3) To provide, in one embodiment, an instrument for use in maser action at frequencies ranging from low radio frequencies to very high microwave frequencies.

Other objects of this invention will appear in the following description and appended claims, reference being had to the accompanying drawing forming a part of this specification wherein like reference characters designate corresponding parts in the several views.

In the drawings:

FIGURE 1 is a helium energy level diagram showing the energy separation in terms of reciprocal wavelength units between the $2^3P$ states and the metastable $2^3S_1$ state;

FIG. 2 is a cathode ray oscillograph trace of a signal emanating from apparatus utilized according to the present invention;

FIG. 3 is an illustration of one embodiment of apparatus constructed according to the present invention;

FIG. 4 is a perspective view of a second embodiment of apparatus constructed according to the present invention; and FIG. 5 is a sectional view taken substantially along the line 5—5 of FIG. 4 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The present invention resulted from my observation of the behavior of metastable helium atoms located within a magnetic field which were first subjected to the action of unpolarized resonance radiation and subsequently, but concurrently with it thereafter, subjected to the action of a radio frequency magnetic field. I have made the novel discovery that metastable helium atoms can be aligned by the action of resonance radiation from a helium arc lamp. I have further discovered that the alignment can be diminished by the action of a radio frequency magnetic field acting on the metastable atoms.

Utilizing the phenomena of alignment and destruction of alignment, I have evolved a method and apparatus for obtaining precise field strength measurements of a magnetic field. The method comprises continuously producing metastable helium atoms in the state denoted as $2^3S_1$ within a closed vessel containing normal gaseous helium. The metastable helium atoms, for the purposes of the following discussion, may be termed a "dilute sea." Conversion of normal helium atoms to the metastable state may be accomplished, for example, by means of an electrical discharge within the vessel. The vessel is constructed of a material which will transmit the resonance radiations generated by a helium arc lamp. A helium arc lamp is provided to emit resonance radiation, principally in the near infrared range of the electromagnetic spectra. The resonance radiation of the helium arc lamp is beamed through the vessel containing the dilute sea of metastable helium atoms to cause alignment of the dilute sea. With the dilute sea aligned, a maximum amount of resonance radiation from the helium arc will pass through the dilute sea. When the alignment of the metastable helium atoms is diminished by an applied radio frequency magnetic field, there is an increased absorption of the resonance radiation by the metastable helium atoms. The increment of change in the amount of resonance radiation absorbed may be monitored to give a measurement of the diminution of alignment. The diminution in alignment is determined by the frequency and strength of the applied radio frequency magnetic field. If the strength of this field is held constant, and the frequency is varied, a point will be reached where the alignment of the metastable atoms is diminished to a maximum extent. This may be measured, as previously mentioned, by monitoring the resonance radiation passing through the dilute sea of metastable atoms and noting the frequency at which the radiation reaches a minimum. By utilizing the formula $$H = \frac{2\pi mcf}{e}$$

in which $f$ is the radio frequency in cycles per second, $e$ is the charge of the electron, $m$ is the mass of the electron, and $c$ is the velocity of light, and inserting the frequency of the radio frequency magnetic field, the value of $H$, which is the strength of the field to be measured, may be obtained in gaussian units.

The theory of the present invention may be described in connection with some of the features of the helium energy level diagram of FIG. 1. For the present discussion, the term "resonance radiation" refers specifically to the light emitted in transitions from the set of closely spaced $(1S2P)^3P$ levels to the $2^3S_1$ metastable levels shown in FIG. 1, the resonance radiation having a wavelength of approximately 10,830 Angstrom units. The light originating from the helium arc used in the present invention comes from the downward transition of the $2^3P_2$, $2^3P_1$, and $2^3P_0$ states of helium in the arc and will be denoted as $D_2$, $D_1$, and $D_0$ radiation, respectively. In a typical helium arc the $D_2$ and $D_1$ radiations are totally unresolved but are completely separate from the $D_0$ radiation. Thus the $D_2$ and $D_1$ radiations have equal intensity and, from a consideration of the statistical weights, should be more intense than the $D_0$ radiation. Let it then be assumed that the intensities of the $D_2$, $D_1$, and $D_0$ radiations are in the ratio of $1:1:K$.

If a beam of the helium arc radiation is directed into a dilute sea of metastable helium atoms which are being continuously produced in a discharge tube, a portion of the radiation will be absorbed by the metastable helium atoms and excite these atoms to the $2^3P$ state. The rates at which the $m=1$, $m=0$, and $m=-1$ states of $2^3S_1$ adsorb the resonance radiation may be denoted as $R_1$, $R_0$, and $R_{-1}$ respectively. If the radiation is projected colinear with the magnetic field in which the dilute sea is situated, it can be shown that $R_1:R_0:R_{-1}=5+K:6:5+K$. This result can be obtained from the general relations given in Condon and Shortley, The Theory of Atomic Spectra, chapter 3, Cambridge University Press, 1957. The helium atoms in the discharge tube which have been excited to the $2^3P$ states will re-radiate back to the $2^3S_1$ levels without preference because they are thoroughly mixed by collisions with other atoms in the discharge tube. Let the populations of the $m=1$, $m=0$, and $m=-1$ levels of $2^3S_1$ be denoted by $n_1$, $n_0$, and $n_{-1}$ respectively. Neglecting relaxation effects, it follows that the steady state populations will be $6:5+K:6$. Thus there is an alignment in the $2^3S_1$ states provided K differs from unity.

The alignment of the metastable helium atoms can be diminished by a radio frequency magnetic field, the frequency of which is at the resonance frequency determined by the $2^3S_1$ splitting. An inspection of the values of $R_1$, $R_0$, and $R_{-1}$ reveals that there will be an increase in the amount of resonance radiation absorbed by the metastable atoms when the radio frequency is the same as the resonance frequency. This increased absorption accounts for the sign of the curve shown graphically in FIG. 2.

It is not necessary to the invention that the resonance radiation be projected colinear with the magnetic field to be measured. If the resonance radiation of the helium arc is projected at right angles to the magnetic field rather than colinear therewith, $$R_1:R_0:R_{-1} = (11+K):(10+2K):(11+K)$$

This leads, in the absence of relaxation effects, to an alignment specified by $$n_1:n_0:n_{-1} = (10+2K):(11+K):(10+2K)$$

A radio frequency field, applied as previously discussed, will also diminish this alignment with a resultant increased absorption of the resonance radiation by the metastable helium atoms. Consequently, the same sense of signal may be observed as when the light was colinear with the magnetic field.

There is, however, one angle of projection at which the helium arc beam will not produce alignment. This occurs when the beam is projected at an angle of arc cos $[(\frac{1}{3})^{\frac{1}{2}}] \cong 55°$ to the axis of the magnetic field to be measured. This conclusion follows from a consideration of the sum rules discussed in the reference of footnote (1) and is independent of the values for the transition matrix elements. I have experimentally verified this prediction.

In arriving at the conclusion that the helium arc beam will align metastable helium atoms, I have assumed that $D_2:D_1:D_0=1:1:K$. This was done to simplify the problem and also because these relationships are typical. However, a consideration of the general case where $$D_2:D_1:D_0 = 1:C:K$$

reveals that an alignment is produced provided either C or K, or both, differ from unity.

The same basic effects described above will be exhibited if the foregoing analysis is applied to circularly, linearly, or elliptically polarized resonance radiation beamed at a dilute sea of metastable helium atoms. There are, however, some differences in the effect on the metastable helium atoms. For example, if the resonance radiation is circularly polarized, the metastable helium will be polarized rather than simply aligned e.g., $n_1 > n_{-1}$. This feature can be exploited for maser action. It may be utilized for maser action at a wide range of frequencies, from low radio frequencies to very high microwave frequencies. The frequency at which the polarized metastable helium will give maser action is, of course, determined by the magnetic field in which the helium is situated.

An additional factor not considered in the preceding calculations is the relaxation processes which the metastable helium atoms are constantly undergoing. The relaxation referred to is the transition of the helium atoms in the $2^3S_1$ states to lower energy levels, as well as a "scrambling" of these states. I believe that the major cause of relaxation is quenching of the metastable states by impurities, including electrons, that are present in the discharge and that the relaxation time is of the order of one millisecond. The effect of relaxation is to decrease the alignment of the metastable atoms with a resultant increase in absorption of resonance radiation and a decrease in the magnitude of the dip shown in FIG. 2. Consequently, relaxation does not affect the frequency and may be ignored.

Referring now to FIG. 3, suitable apparatus 10 for carrying out the method of the present invention may comprise a discharge tube 12, a helium arc lamp 14, a detector 16, an amplifier 18, a display circuit 20, a pair of Helmholtz coils 22, and a radio frequency generator 24.

The discharge tube 12 as shown comprises a closed cylindrical vessel 32 fitted with an electrode 34 at each end. The vessel 32 contains spectroscopically pure helium gas at a pressure such that the metastable helium atoms produced in the discharge have sufficiently long lifetime to permit alignment. Preliminary indications are that the pressure may be varied over a range of approximately 1 to 100 mm. Hg. An electrical discharge may be produced in the vessel 32 by applying a direct current potential to the electrodes 34. The discharge is for the purpose previously discussed of exciting normal helium to the metastable state. The discharge strength should be sufficient to maintain a density of metastable atoms in a range of about $10^9/cm.^3$ to $10^{11}/cm.^3$. The vessel 32 may be fabricated from a material such as glass which is transparent to the helium resonance radiation. If desired, the vessel 32 may be constructed of an opaque material and provided with windows transparent to the resonance radiation. The discharge tube may be of any arbitrary shape such, for example, as a cylinder or sphere.

The method of exciting the helium in the discharge tube 12 may be by means of direct current as shown, or by means of other methods such as a high frequency electric field. If a high frequency field is used, the electrodes 34 are not necessary. As a further alternative, metastable helium atoms may be produced in the discharge tube 12 by means other than electrical discharge. For example, a quantity of natural or artificial radioactive material placed inside or adjacent to the vessel 32 will produce metastable helium atoms from the normal helium atoms therein. Additionally, X-rays, generated within or without the vessel 32, may be utilized for the production of metastable helium atoms.

The Helmholtz coils 22 are provided to modulate the magnetic field being measured. Each coil 22 is positioned adjacent one side of the vessel 32 with its axis parallel to the axis of the field being measured. A low frequency alternating current may be used to drive the coils 22 and provide a weak modulating field. The alternating current may be generated as desired with any desired wave form. The function of the coils 22 is to cause the magnetic field being measured to oscillate slightly around its true value so that a visual signal may be observed on an oscilloscope which may be provided in the display circuit 20. Configurations other than the Helmholtz geometry may be employed to achieve the desired magnetic modulation. When the magnetic field is modulated in this manner, a voltage signal proportional to the modulation signal should be supplied to the horizontal axis of the oscilloscope being used to display the dip shown in FIG. 2.

Frequency modulation may be employed in lieu of magnetic modulation. In this arrangement the variable frequency power supply 24 is frequency modulated and a voltage signal proportional to this modulation is supplied to the horizontal axis of the oscilloscope being used to display the dip shown in FIG. 2.

The R-F coil 30 may be simply several turns of wire wound around the vessel 32. The function of the coil 30 is, as previously mentioned, to impress a variable radio frequency magnetic field upon the aligned metastable atoms in the discharge tube 12. The coil 30 may be driven by any suitable variable frequency oscillator 24, such as a Hartley oscillator, to produce the desired magnetic field. The oscillator 24 may also be used to drive the helium arc lamp 14 and the discharge tube 12. Methods other than the R-F coil 30 may also be used to provide a radio frequency magnetic field. For example, a beam of a radio frequency magnetic field may be projected into the discharge tube 12 from a remote point.

It is to be noted that the radio frequency coil 30 is arranged to produce a magnetic field which has some components substantially at right angles to the axis of the field being measured, denoted by the north-south arrow 28 in FIG. 3. It is essential to the operation of the device 10 that a component of the radio frequency magnetic field be provided at right angles to the constant magnetic field so that there will be field lines operating to diminish the alignment of the metastable helium atoms.

The helium arc lamp 14 is essentially a discharge tube similar in operation to the aforementioned discharge tube 12. It comprises a closed vessel 35 which is filled with helium gas and is excited by means of electrodes 36 provided at either end of the vessel 35. The lamp 14 may be electrically driven in a manner similar to the discharge tube 12. However, since it is desired to excite the helium in the lamp 14 much more strongly than in the discharge tube 12, it is necessary to create a stronger electrical discharge therein. It may be excited with any power source capable of producing a sufficiently strong source of helium resonance radiation to cause alignment of the metastable helium atoms in the discharge tube 12. One suitable commercially available lamp is the Osram spectrographic helium arc lamp.

The detector 16, which monitors the helium resonance radiation transmitted through the discharge tube 12, may be any of several such devices sensitive to a helium resonance radiation. Suitable devices are lead sulfide detectors or photo tubes. The signal from the detector 16 is amplified by means of a suitable amplifier 18 and then fed into the display circuit 20 which may consist of a cathode ray oscilloscope.

The method known as "narrow banding" may be utilized to increase the signal to noise ratio of the system 10. For a detailed description of the "narrow banding" method, reference is made to Nuclear Magnetic Resonance, by E. R. Andrew, (1956), Cambridge University Press, London, England, pp. 43–46. Briefly, an increase in the signal to noise ratio acts to increase the precision with which the resonance frequency of the R.-F. magnetic field can be determined. Narrow banding may be accomplished by employing either frequency or magnetic modulation. The modulating device may comprise any of the suitable circuits utilized for frequency or magnetic modulation. The modulating wave is provided with an amplitude equal to or less than the width of the resonance signal to be measured. The output of the detector 16 is fed into an amplifier 18 which has a very narrow band width centered about the modulating frequency. The output of the amplifier 18 is thus essentially proportional to the derivative of the resonance line shape with respect to the magnetic field. Consequently, the point of maximum dip in FIG. 2 may be determined with great accuracy.

The output of the amplifier 18 is fed into a display circuit 20 which may comprise a cathode ray oscilloscope as previously mentioned. The cathode ray oscilloscope will display a resonance curve as shown in FIG. 2. The dip in the resonance curve shown corresponds to the strength of the magnetic field being measured. In practice, the magnetic field displayed is equal to the sum of the measured field and the modulating field. In the trace shown, the measured field was 0.5 Gauss and the modulating field had an amplitude of 0.012 Gauss.

As previously mentioned in the objects, the apparatus of FIG. 3 may be used as a primary frequency standard. It is preferred to use helium 3 in the discharge tube 12 for such an application. Helium 3 is a stable isotope of helium. Helium 3 in the $^3S_1$ state exhibits a hyperfine structure having a zero-field splitting of approximately 7000 mc./sec. This large splitting can be exploited as a basis for a frequency standard.

In operation, the helium arc lamp 14 radiates unpolarized resonance radiation which in this instance is collimated by means of a lens 26 and directed in a path to pass through the discharge tube 12. Metastable helium atoms, which are continuously produced in the discharge tube 12, are aligned by the resonance radiation from the lamp 14 as previously discussed. It will be noted that the path of the resonance radiation is parallel to the axis of the magnetic field, in this case the earth's magnetic field, in which the discharge tube is located. The direction of the earth's magnetic field is indicated by the north-south arrow 28 while the direction of the resonance radiation is indicated by the dotted lines. The light passing through the discharge tube 12 is monitored by the photo-sensitive detector 16 located at the opposite side of the discharge tube 12 from the lamp 14. The radio frequency coil 30 mounted around the discharge tube 12 is driven to induce a radio frequency magnetic field within the discharge tube 12. The frequency of the radio frequency oscillator 24 is variable over the range of interest. As previously discussed, in one very narrow frequency range, the alignment of the metastable helium atoms will be destroyed, with the result that less light will reach the photo-sensitive detector 16. The reduction in light sensitivity may be referred to as the signal. The frequency of the radio frequency magnetic field at which the signal is maximum may be inserted into the above formula $$H = \frac{2\pi mcf}{e}$$

to provide an accurate measurement of the constant magnetic field in which the discharge tube 12 is located.

FIGS. 4 and 5 show an embodiment of the apparatus of the present invention in which a helium arc lamp 40 is positioned within a discharge tube 66 to radiate directly into the discharge tube 66 without the necessity for collimation. The device 38 comprises a helium arc lamp 40 which is surrounded by a shield 42 and a tubular closed vessel 44. The vessel 44 contains helium gas which may be excited by means of a pair of electrodes 46 driven by a discharge power supply 88 in much the same manner as previously discussed for the discharge tube 12 of FIG. 3. A radio frequency coil 50 is wound around the vessel 44 to produce a radio frequency magnetic field as previously described and may be driven, for example, by a frequency modulated signal generator 86. A ring-like photo-sensitive detector 48 is provided extending around the exterior of the R.-F. coil 50 to receive the resonance radiation passing through the discharge tube 66. The photo-sensitive detector 48 may comprise a plurality of lead sulfide cells 68 arranged in a ring structure and connected either in series or parallel. The signal from the detector 48 is fed into amplifying and display circuits 90 for determination of that frequency of the radio frequency magnetic field which produces the maximum signal.

The lamp 40 comprises an envelope 52, consisting of a pair of closed cylindrical portions 70 in open communication with each other via the necked-down portion 72. An electrode 53, 54 is provided in each cylindrical portion 70. The envelope 52 is filled with helium gas. The pressure of the helium gas is not critical and may be varied between approximately two mm. Hg and 20 mm. Hg. The configuration of the vessel 52 may be varied over wide ranges, although rotational symmetry should be preserved if good magnetic shielding is desired.

The envelope 52 may be fabricated of any suitable material which is transparent to helium resonance radiation within the regions utilized. Fused quartz or glass are preferred envelope materials because they have the desired transparency and are relatively low-cost materials. The electrode material may also be varied. Suitable electrode materials are aluminum, molybdenum, tungsten and tantalum. Various electrode materials have somewhat different properties with respect to sputtering and hence affect the life of the tube.

The shield 42 comprises an open-ended metal sleeve 56 which fits over the lamp envelope 52. A metallic plug 58 is provided to close one end of the sleeve 56 and to make electrical contact with the electrode 53 at one end of the envelope 52. A tubular plug 60 is provided at the opposite end of the sleeve 56. The plug 60 has a hollow enlargement 74 for the mounting of a coaxial cable fitting 76. The metal body 80 of the fitting 76 makes electrical contact with the shield 42 and is adapted to be connected to the outer conductor of a coaxial cable. The fitting 76 is also provided with a conductor 82 insulated from the body portion 80 and connected to the lamp electrode 54 by means of a lead 78. The conductor 82 is adapted to contact the inner conductor of a coaxial cable and connect it to the electrode 54. The central portion of the sleeve 56 is provided with apertures 62 for the transmission of resonance radiation which is at a maximum at the center of the lamp 40. The current for the lamp 40 is thus provided along a strictly coaxial path, minimizing the production of stray magnetic fields which could decrease the accuracy of a measurement if the lamp is operated at low frequency or direct current. The plugs 58, 60 and sleeve 56 are constructed of a non-magnetic metal such as brass. The shield 42, in addition to its anti-magnetic properties, also provides mechanical rigidity and protection for the lamp 40.

The power supply for the lamp 40 may be either direct current or radio frequency current and is connected to the lamp 40 by means of a coaxial cable 64 provided between the lamp and the power supply. A radio frequency power supply is preferred to a direct current power supply. The lamp 40 tends to operate more quietly with R-F power than with D.C. power because there is a strong tendency towards oscillatory behavior in D.C. discharges. Also, the R-F source appears to reduce "sputtering" of the electrodes. In addition, any stray magnetic fields produced by the lamp current will tend to average out because of the oscillatory nature of radio frequency power.

Radio frequency power may be supplied to the lamp 40 by means of any conventional oscillator 84, such as a single-ended or push-pull Hartley oscillator. The power requirements of the lamp 40 in one model were approximately 15 watts but may be reduced by reduction in lamp size. The frequency of the power supply may be varied from approximately two to twelve megacycles per second, although the higher frequencies generally require more care in matching the impedance of the lamp to that of the power supply.

In one embodiment of the apparatus 38, one sheet of polarizing material is wrapped around the shield 42 or lamp 40 and another sheet is interposed between the discharge tube 66 and detector device 48. This arrangement tends to discriminate against the scattered resonance radiation which is created within the discharge tube 66 and thus improves the signal-to-noise ratio of the device 38.

Some of the advantages of the device 38 are that it has a low power consumption, is virtually non-magnetic and exhibits only very small fluctuations in light intensity, particularly in the range of low frequencies often called "microphonic." The device 38 is also rugged, has a long life, is relatively inexpensive to produce, is lightweight, and is essentially insensitive to orientation.

As may be discerned from the above description of the apparatus of FIG. 3 and FIGS. 4 and 5, the unique relationships between excited helium atoms, resonance radiation, and magnetic fields, which I have validated theoretically and experimentally, have been incorporated directly into useful equipments. I believe that other important uses will evolve from these discoveries. The present direction of technological development, particularly as it concerns exploring the outer space, indicates there will be a need for instruments capable of accurately measuring and detecting some of the hitherto unknown qualities and quantities of matter and energy. I believe that the process of the present invention will contribute to the successful solution of many of such probable instrumentation problems.

Having thus described my invention, I claim:

1. In the process of obtaining measurements of an ambient magnetic field H, the steps of exciting ground state helium atoms to the metastable $2^3S_1$ state, passing through said metastable helium atoms a beam of resonance radiation from a helium arc, said radiation having spectral properties producing alignment of said metastable helium atoms upon interaction therewith; situating the aligned helium atoms in said magnetic field H; subjecting said helium atoms to a radio frequency magnetic field; varying the frequency of the radio frequency magnetic field until the frequency is reached at which a maximum diminution of alignment of the metastable helium atoms occurs which is shown by a maximum decrease in the amount of resonance radiation passing therethrough; detecting changes in the amount of said resonance radiation passing through said metastable helium atoms, and substituting the value of this frequency in the formula $$H = \frac{2\pi mcf}{e}$$

in which $f$ is the radio frequency in cycles per second, $e$ is the charge of the electron, $m$ is the mass of the electron, and $c$ is the velocity of light, whereby to obtain the value of H in Gaussian units.

2. A device for measuring the strength of a magnetic field comprising a contained body of helium gas the atoms of which are acted upon by said magnetic field when in the presence thereof; means to excite the body of helium gas for continuously producing metastable $2^3S_1$ helium atoms; a source of resonance radiation impingeable upon and interacting with the body of helium gas for producing alignment of said metastable helium atoms contained therein; means to create and direct into the body of helium gas a radio frequency magnetic field of such frequency as to diminish the alignment of metastable helium atoms contained in the body of helium gas; and means to measure the changes in the amount of resonance radiation absorbed by said metastable helium atoms.

3. A device for measuring the strength of an ambient magnetic field comprising a vessel containing helium gas the atoms of which are acted upon by said magnetic field when in the presence thereof; means to continuously excite a portion of the contained helium gas to the metastable $2^3S_1$ state; a source of resonance radiation positioned adjacent said vessel adapted to radiate resonance radiation into and through the contained helium gas and interact therewith for producing alignment of said metastable $2^3S_1$ state thereof; means to produce a variable frequency radio frequency magnetic field positioned to act upon the contained helium gas; means to modulate said ambient magnetic field to be measured; and means cooperating with said modulating means to measure the amount of resonance radiation passing through the vessel containing helium gas.

4. A device for measuring the strength of an ambient magnetic field comprising a vessel containing helium gas the atoms of which are acted upon by said magnetic field when in the presence thereof; means to continuously excite a portion of the contained helium gas to the $2^3S_1$ metastable state; a source of resonance radiation positioned adjacent said vessel adapted to radiate resonance radiation into and through the contained helium gas and interact therewith for producing alignment of said metastable $2^3S_1$ state thereof; means to produce a variable frequency radio frequency magnetic field positioned to act upon the contained helium gas; means to modulate the frequency of the radio frequency magnetic field; and means cooperating with said modulating means to measure the amount of resonance radiation passing through the vessel containing helium gas.

5. Apparatus for measuring the strength of a magnetic field comprising a helium arc lamp; a non-magnetic shield surrounding said lamp; said shield having apertures for the transmission of light from the helium arc lamp; an annular helium discharge tube extending around the shield to receive light transmitted through said apertures; a radio frequency coil wound around the discharge tube; and means including an annular photo-sensitive detector device extending around the discharge tube for sensing the level of that portion of said light which passes through said discharge tube.

6. Apparatus for measuring the strength of a magnetic field comprising a helium arc lamp adapted to emit resonance radiation; a helium discharge tube extending around the helium arc lamp adapted to receive resonance radiation therefrom; a radio-frequency coil wound around the discharge tube; and means including a photo-sensitive detector device extending around the discharge tube for sensing the level of light received through said discharge tube.

7. Apparatus for measuring the strength of a magnetic field comprising a helium arc lamp adapted to emit resonance radiation; a first layer of polarizing material extending around the helium arc lamp; a helium discharge tube extending around the first layer of polarizing material adapted to receive polarized resonance radiation; a second layer of polarizing material extending around the helium discharge tube; a radio-frequency coil wound around the discharge tube; and means including a photo-sensitive detector device extending around the discharge tube for sensing the level of light received through said discharge tube.

8. In the process of aligning helium atoms in the sublevels of the metastable $2^3S_1$ state and detecting that alignment, the steps of exciting ground state helium atoms to the metastable $2^3S_1$ state, situating the atoms in said metastable $2^3S_1$ state in an ambient magnetic field and aligning the atoms in said metastable state by subjecting said atoms to resonance radiation from a helium arc, altering the alignment of the atoms in said metastable state by subjecting said atoms to a radio-frequency magnetic field, and detecting the alteration of said alignment in terms of the amount of resonance radiation absorbed by said atoms in said metastable state.

9. In the process of aligning helium atoms in the sublevels of the metastable $2^3S_1$ state and detecting that alignment, the steps of exciting ground state helium atoms to the metastable $2^3S_1$ state, situating said atoms in an ambient magnetic field and aligning the atoms in said metastable state by subjecting said atoms to unpolarized resonance radiation from a helium arc, altering the alignment of said atoms in said metastable state by subjecting said atoms to a radio-frequency magnetic field, and detecting the alteration of said alignment in terms of the amount of resonance radiation absorbed by said atoms in said metastable state.

10. In the process of aligning helium atoms in the sublevels of the metastable $2^3S_1$ state and detecting that alignment, the steps of exciting ground state helium atoms to the metastable $2^3S_1$ state, situating said atoms in an ambient magnetic field and aligning the atoms in said metastable state by subjecting said atoms to polarized resonance radiation from a helium arc, altering the alignment of said atoms in said metastable state by subjecting said atoms to a radio-frequency magnetic field, and detecting the alteration of said alignment in terms of the amount of resonance radiation absorbed by said atoms in said metastable state.

11. In the process of making measurements of an ambient magnetic field, the steps of exciting ground state helium atoms to the metastable $2^3S_1$ state, situating said atoms in the ambient magnetic field and aligning the atoms in said metastable state by subjecting said atoms to resonance radiation from a helium arc, subjecting said atoms to a radio frequency magnetic field to affect the alignment of said metastable atoms, and measuring the effect of said radio frequency magnetic field on the alignment of the metastable helium atoms in terms of the amount of resonance radiation absorbed by said metastable atoms as a function of the frequency of said radio frequency magnetic field.

12. In the process of aligning helium atoms in the sublevels of the metastable $2^3S_1$ state and detecting that alignment, the steps of exciting ground state helium atoms to the metastable $2^3S_1$ state, situating said atoms in an ambient magnetic field and aligning the atoms in said metastable state by subjecting said atoms to circularly polarized resonance radiation from a helium arc, altering the alignment of said atoms in said metastable state by subjecting said atoms to a radio-frequency magnetic field, and detecting the alteration of said alignment in terms of the amount of resonance radiation absorbed by said atoms in said metastable state.

13. A device for measuring the strength of an ambient magnetic field comprising a contained body of helium gas the atoms of which are acted upon by said magnetic field when in the presence thereof; means to excite the body of helium gas whereby to produce metastable $2^3S_1$ helium atoms; a source of circularly polarized resonance radiation impingeable upon the body of helium gas whereby to pass through the body of helium gas and polarize metastable helium atoms contained therein by interaction therewith; means to create and direct into the body of helium gas a radio frequency magnetic field of such frequency as to diminish the polarization of the metastable helium atoms contained in the body of helium gas; and means to measure the amount of resonance radiation passing through the body of helium gas.

References Cited in the file of this patent

Kastler: Journal of the Optical Society of America, vol. 47, No. 6, June 1957, pp. 460 to 465.

Brossel et al.: Physical Review, vol. 66, No. 3, May 1, 1952, pp. 308 to 316.

Bell et al.: Physical Review, vol. 107, No. 6, Sept. 15, 1957, pp. 1559 to 1565.

Wieder et al.: Physical Review, vol. 107, No. 1, July 1957, pages 125 to 134.

Ebbinghaus: Annalen der Physik, vol. 7, 1930, pages 267–292.

Skillman: Journal of Geophysical Research, vol. 63, No. 3, September 1958, pages 513 to 515.

Wood: Philosophical Magazine, Ser. 7, vol. 2, pages 529 to 538, incl., September 1926.

Dehmelt: Physical Review, vol. 105, No. 5, March 1957, pages 1487–1489 incl.

Dehmelt: Physical Review, vol. 103, No. 4, Aug. 15, 1956, pp. 1125 and 1126.

Dehmelt: Physical Review, vol. 105, No. 6, Mar. 15, 1957, pp. 1924 and 1925.

Lamb et al.: Physical Review, vol. 195, No. 2, Jan. 15, 1957, pp. 573 to 579 incl.